Feb. 6, 1951 J. H. HOERN 2,540,520
MACHINE
Filed Jan. 22, 1947 2 Sheets-Sheet 1
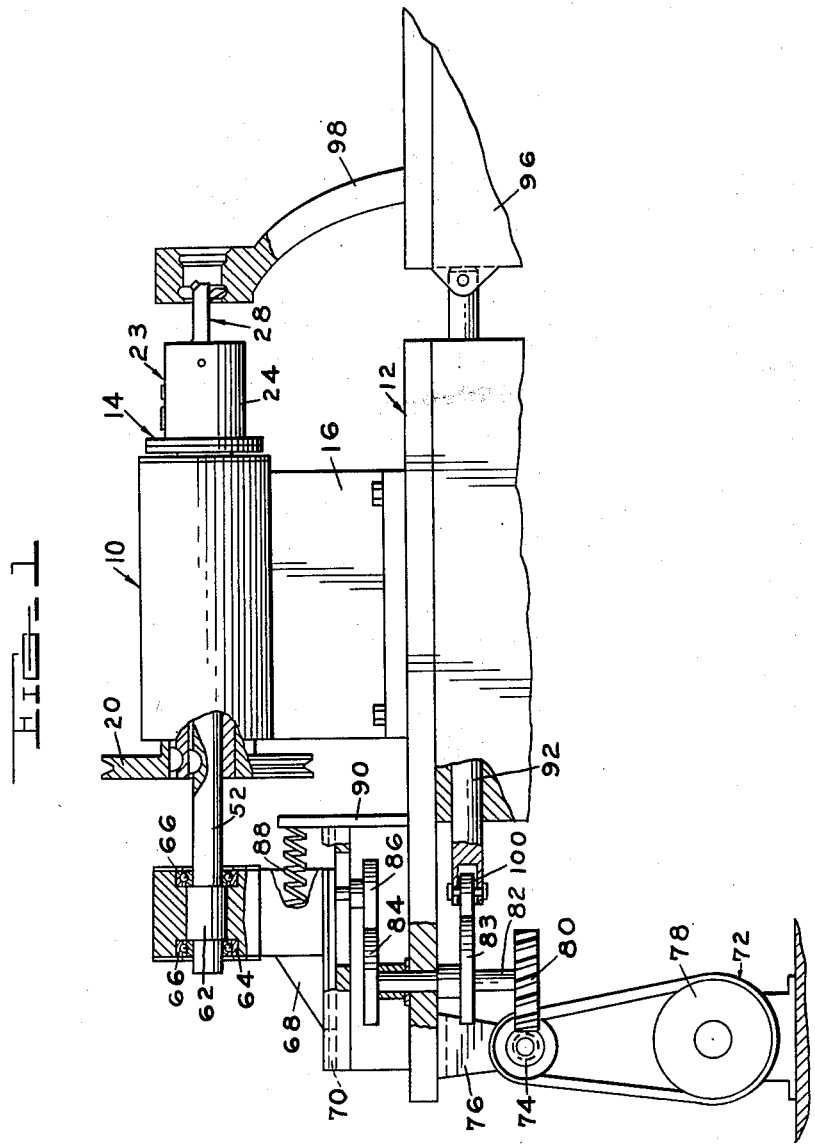
INVENTOR.
JOSEPH H. HOERN
BY
ATTORNEY Feb. 6, 1951 J. H. HOERN 2,540,520
MACHINE
Filed Jan. 22, 1947 2 Sheets-Sheet 2
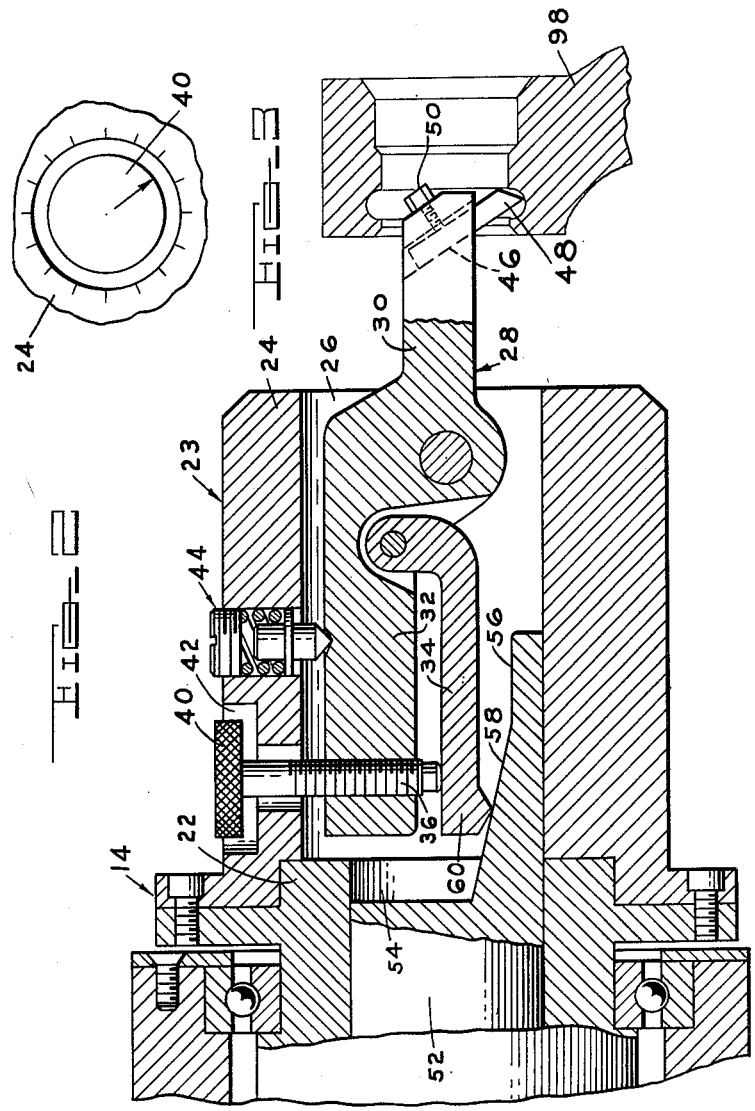
INVENTOR.
JOSEPH H. HOERN
BY
ATTORNEY Patented Feb. 6, 1951

2,540,520

UNITED STATES PATENT OFFICE 2,540,520

MACHINE

Joseph H. Hoern, Birmingham, Mich., assignor of one-half to Carl E. Dilts, Saginaw, Mich.

Application January 22, 1947, Serial No. 723,498

2 Claims. (Cl. 77—58)

This invention relates to metal working machines and more particularly to rotary boring machines and associated parts thereof.

Broadly this invention comprehends the provision of a boring type metal working machine having associated therewith mechanism permitting of the automatic precision machining of work pieces requiring numerous variations in cross sectional profile, said mechanism including a micrometric adjustable cutting tool supporting element.

Although numerous machines of the metal working category have been devised for the automatic machining or boring of complicated internal profiles, none has achieved the degree of machining accuracy obtainable with the instant machine. This high degree of accuracy is obtainable in most part by the provision of a boring head incorporating a novel micrometer adjustment for the cutting tool.

An object of the invention is the provision of a metal working or cutting machine for performing boring operations in an accurate, efficient, and economical manner.

Another object of the invention is the provision of an automatic boring machine having means incorporated therewith relative to the cutting tool thereof adapted to produce precision profiles on work pieces machined thereby.

A further object of the invention is the provision of a metal working machine for automatically boring compound profiles in a simple, efficient manner including a boring head having a micrometer tool adjustment adapted to provide for precision of the boring operation.

Other objects and advantages of the invention will appear from the following description taken in connection with the drawings, forming a part of the specification; and in which:

Fig. 1 is a fragmentary partially sectionalized view of a boring machine incorporating the features of the instant invention;

Fig. 2 is an enlarged cross sectional view of the boring head illustrating the micrometer adjustment for the cutting tool; and Fig. 3 is a top plan view of the micrometer adjustment screw.

By the provision of a boring head having a micrometer tool adjustment to a boring machine of the type for machining intricate or compound bores, it has become possible to produce a bored profile of high accuracy thereby eliminating many additional machine operations that might otherwise be required. The innovation of this boring head provides for increased economy over previous methods used to accomplish the same result.

Referring to the drawings for more specific details of the invention, 10 represents generally a machine of the general rotary type comprising a base 12, and a rotary head 14 journaled in a bearing box 16 suitably fixedly secured as by bolts 18 upon the base 12. The head 14 is journaled upon bearings 18 in box 16 and is driven from a suitable source of power, not shown, by way of pulley 20 fixedly secured to the head 14.

The rotary head 14 has detachably secured at one end 22 thereof a boring head 23 which constitutes the basis of the instant invention.

The boring head 23 comprises a cylindrical body 24 having a central bore 26 therethrough in which is pivotally mounted a cutting tool holder 28 including a tool holding arm or extension 30 adapted to extend beyond the end of the body 24 and an arm or extension 32 extending in an opposite direction from arm 30 within the full confines of bore 26. A lever arm 34 is pivotally mounted upon arm 32 adjacent the pivot point of holder 28 and is adapted to be adjusted relative to arm 32 by an adjustment screw 36 that is threadedly secured in the free end of arm 32 and has its extremity in contact bearing engagement upon arm 34 at the free end thereof the purpose of which will hereafter appear.

The adjustment screw 36 extends through an aperture 38 in body 24 and includes a head 40 which is fully received in a bore 42 communicating with aperture 38. The head 40 is provided with a marker point which in association with dial markings upon the exterior of body 24 at the circumference of bore 42 affords micrometric measurement means for the proper adjustment of tool holder 28.

The tool holder is tensioned against its pivotal loading actuating mechainsm by an adjustable spring means 44 and provides in the extremity of arm 30 thereof a slot 46 adapted to receive a cutting tool bit 48 secured therein by a set screw 50 threaded in the arm 30.

The means for actuating the tool holder 28 effective to provide for the variable radial movement thereof about its pivot includes a bar or rod 52 mounted for axial shifting movement within a bore 54 extending throughout the length of head 14 and communicating with bore 26 in head 22. The rod 52 is keyed to head 14 permitting of axial movement therebetween but restricting rotation therebetween, the purpose of which will hereinafter appear.

One end 54 of rod 52 is cut away and provides an axial land portion 56 and an angular section 58 that are adapted to engage a foot end 60 of lever arm 34 and thereby control the normal cutting position of holder 28.

The other end 62 of end 52 is enlarged and is journaled in a bearing support 64 so as to be freely rotatable therein in accordance with the powered rotation of pulley 20 and head 14 but is retained from shifting movement relative to the support 64 by bearings 66 supporting said rod.

The bearing support 64 includes a base portion 68 which is mounted for sliding engagement upon a slide bearing 70 which in turn is fixedly secured upon the machine base 12. The bearing support is adapted to be actuated axially relative to and away from the bearing box 16 from a suitable source of power such as an electric motor 72 through an arrangement of gear and cams which comprises a spur gear 74 mounted upon a support 76 extending downwardly from the table top of base 12, driven by a belt from motor pulley 78, a gear 80 meshing with gear 74 having a supporting shaft 82 journaled in base 12, said shaft having a pair of cams 83 and 84 arranged therein, and cam 84 having roller bearing engagement with a circular ring 86 which is secured upon base portion 68 effective to transmit the motion of cam 84 as controlled by the rotation of gear 80 driven from gear 74. The support 64 is held in position thereby effecting proper engagement between ring 86 and cam 84 by a spring 88 arranged axially intermediate an end plate 90 mounted on slide bearing 70 and base portion 68 of support 64.

In view of the necessity to move the work piece which is to be machined relative to the cutting tool to provide for the boring thereof, the cam 83 is adapted to engage a slide rod 92 that is slidably supported in base 12. The slide rod has one end 94 thereof affixed to a slidable work table 96 upon which a work piece 98 is adapted to be secured and has a roller 100 at its other end engaging the operating surface of cam 83. The work table 96 and rod 92 are adapted to be held in resilient opposing engagement to the cam 82 by means, not shown.

It is to be understood that the cams 83 and 84 are to be selected according to the configuration of the bore to be machined upon the work piece inasmuch as the lift, fall, and dwell of the cams control the distance and rate of movement respectively of the tool holder and tool bit, and work table and work piece.

In a normal operation with the cams 83 and 84 selected according to the work to be performed upon a predetermined work piece, it is first necessary to establish a proper cutting relation between the cutting tool and work piece; and this is done by arranging the tool holder, that is lever 34 with the foot end 60 in contacting engagement upon axial land portion 56 of rod 52.

With the foot 60 and land 56 in engagement the cutting tool is now required to be cutting its minimum radius and as a means of checking this for accuracy the head 14 is rotated from its power source, not shown, resulting in rotating the boring head 22, holder 28, and cutting tool 48. The work piece is next brought up to cutting relation with the cutting tool and a trial cut is made, said cut then being measured by a micrometer to check it with the required dimension. If the measurement is not in accordance with requirements it is readily determined by what amount the tool is to be adjusted to give the proper measurement. By a simple rotation of the adjustment screw the cutting tool can be brought to its proper cutting position easily and quickly. Rotation of screw 36 results in moving lever 34 toward or away from arm 32 depending on the direction of screw 36, said levers 34 and arm 32 at all times being held against one another through the action of spring means 44 acting upon tool holder 28, said spring also operating to hold the tool holder and cutting tool in firm cutting relation against the resistance of the material that is to be cut from the work piece.

After the cutting tool is set as above described, it is then only necessary to start motor 72 and continue rotation of the boring head simultaneously therewith. The combined rotation of head 22 and actuation of rods 52 and 92 through the rotation of gears and cams 83 and 84 provide for the proper cutting relation of tool 48 relative to the work piece wherein the axial movement of rod 52 places the angular portion 58 of rod 52 into engagement with foot 60 of lever and effects a pivoting of tool holder 28 and radial movement of cutting tool such that the varied required chamfers, curves, and stepped bores as shown by the work piece can be obtained. This completes an operating cycle of the machine.

While this invention has been described in connection with certain specific embodiments, the principle involved is susceptible of numerous other applications that will readily occur to persons skilled in the art. The invention, therefore, is limited only as indicated by the scope of the appended claims.

What I claim is:

1. A metal working machine boring head having a central opening therethrough comprising a tool holder pivotally mounted therein in a plane passing through the axis thereof for rotation therewith and radial movement thereto, including a pair of arms adapted to extend in opposite directions substantially along the axis of the boring head, one arm supporting a cutting tool at the extremity thereof and the other arm having an adjustment lever pivoted therein adjacent the pivot of the holder and an adjustment screw cooperating between the one arm and lever to provide for close cutting adjustment of the cutting tool means for the operational actuation of the tool holder, and spring means supported in the boring head for resisting movement of the tool holder either for adjustment or actuation, said lever at its free end having a cam engaging portion for effecting movement of the tool holder through the actuation thereof.

2. A metal cutting machine rotatable boring head having a central opening therethrough comprising a tool holder pivotally mounted therein near one open end thereof adapted to be radially actuated during the operational use thereof, including a pair of arms extending in opposed directions from the pivot one arm extending outside of the opening in the head and the other extending into the opening, one arm having a tool bit mounting means at one end thereof and the other arm having a lever pivoted thereon adjacent the pivot of the holder extending in an axial direction similarly to the arm extending in the opening in the head, an adjustment screw threaded in the one arm, having the lever pivoted thereon near the free end thereof, engageable with the lever near the free end thereof to provide for a cutting adjustment of the bit, and tensile load adjustable resilient means opposing outward pivotal movement of the tool holder, said adjustment screw providing in conjunction with the boring head a micrometer adjustment dial said lever at its free end, opposite from the side with which the adjustment screw is engageable, having a cam engaging portion for affecting movement of the tool holder through the actuation thereof.

JOSEPH H. HOERN.

REFERENCES CITED

The following references are of record in the file of this patent:

UNITED STATES PATENTS

| Number | Name | Date |
|---|---|---|
| 1,878,175 | Oyen | Sept. 20, 1932 |
| 1,980,178 | Berglund | Nov. 13, 1934 |
| 2,207,067 | Patscheider | July 9, 1940 |
| 2,266,081 | Rogers | Dec. 16, 1941 |